United States Patent [19]
Szwed

[11] Patent Number: 5,861,799
[45] Date of Patent: Jan. 19, 1999

[54] CAR THEFT AND HIGH SPEED CHASE PREVENTION DEVICE

[76] Inventor: Ryszard F. Szwed, 2922 Durand Ave., Racine, Wis. 53403

[21] Appl. No.: 834,481

[22] Filed: Apr. 11, 1997

Related U.S. Application Data

[60] Provisional application No. 60/018,022 May 21, 1996.

[51] Int. Cl.⁶ ...................................... B60Q 1/00
[52] U.S. Cl. .................... 340/425.5; 340/426; 307/10.2; 180/287; 123/179.2; 123/198 B
[58] Field of Search ................. 340/425.5, 426, 340/428, 430, 429; 307/10.2, 10.3, 10.4, 10.5, 10.6; 180/287, 167; 379/37, 38, 39, 58; 123/179.2, 198 B, 146.5 B

[56] References Cited

U.S. PATENT DOCUMENTS

| | | |
|---|---|---|
| 3,657,720 | 4/1972 | Avdenko et al. . |
| 3,834,484 | 9/1974 | Sangster . |
| 4,107,962 | 8/1978 | MacKinnon . |
| 4,158,874 | 6/1979 | Ellsberg . |
| 4,553,511 | 11/1985 | Hayakawa et al. . |
| 4,893,240 | 1/1990 | Karkouti . |
| 4,991,683 | 2/1991 | Garretto et al. . |
| 5,193,641 | 3/1993 | Durrell . |
| 5,276,728 | 1/1994 | Pagliaroli et al. ....................... 340/426 |
| 5,396,216 | 3/1995 | Morgan ..................................... 340/426 |
| 5,432,495 | 7/1995 | Tompkins . |
| 5,448,218 | 9/1995 | Espinosa ................................. 340/426 |
| 5,453,730 | 9/1995 | De-Grinis et al. ...................... 340/426 |
| 5,477,090 | 12/1995 | Davis ...................................... 307/10.5 |
| 5,506,562 | 4/1996 | Wiesner .................................. 340/426 |
| 5,513,244 | 4/1996 | Joao et al. ................................. 379/39 |
| 5,533,589 | 7/1996 | Critzer .................................... 180/287 |
| 5,652,564 | 7/1997 | Winbush ................................. 340/426 |

FOREIGN PATENT DOCUMENTS

| | | |
|---|---|---|
| 307485 | 3/1989 | European Pat. Off. . |
| 2079837 | 1/1982 | United Kingdom . |

*Primary Examiner*—Nina Tong
*Attorney, Agent, or Firm*—Richard C. Litman

[57] ABSTRACT

The invention relates to a device and system for preventing improper use of a car. The device uses an electronically controlled fuel shut off system located internally of the fuel tank. The system requires the operator of the car to enter a private identification number or PIN code in order to operate the vehicle. In addition, the electronically controlled fuel shut off system is remotely activated allowing law enforcement officials, upon encountering the car being used improperly, to shut off the fuel supply and disable the car. Upon entry of a security code by law enforcement officers, the circuit board stops the flow of current to the fuel shut off system, thereby halting the flow of fuel through the fuel line and shutting down the engine.

4 Claims, 4 Drawing Sheets

CAR THEFT AND HIGH SPEED CHASE PREVENTION DEVICE

CROSS-REFERENCE TO RELATED APPLICATION

This application claims the benefit of U.S. Provisional patent application Ser. No. 60/018,022, filed May 21, 1996.

BACKGROUND OF THE INVENTION

1. Field of the Invention

The present invention relates to a device for preventing auto theft, and more particularly to a disabling system including a remotely controlled electromagnetic valve for shutting off fuel flow to an automobile engine.

2. Description of Prior Art

The theft of cars is a well known problem. One skilled in car theft can easily forge keys or by-pass the ignition switch to start the engine. Also, certain anti-theft devices, such as steering wheel locks, brake locks, and/or transmission locks, are easily removed by a crafty thief. Even the more expensive electronic car alarm systems have been thwarted by the experienced car thief. Once stolen by a career car thief, cars are either sold in parts, or used to commit other criminal acts. There is a long felt need to provide a way of preventing a car from being stolen.

Many prior art devices have come about to combat this problem of car theft. For example, U.S. Pat. No. 5,432,495, issued to Thompkins, discloses a remote radio control system for activating an ignition kill switch in the event the car is operated without the consent of the owner. U.S. Pat. No. 5,193,641, issued to Durrell, discloses a system requiring a PIN code in order to keep a car running. That is, if the car is started improperly, after a certain time interval, the fuel system will be cut off unless the PIN code is properly entered. E.P.O. Patent Doc. 317,485, issued to Kimura et al., discloses a system for remotely starting and subsequently operating various features (e.g., heating the passenger compartment) of mobile equipment. U.K. Patent Doc. 2,079, 837, issued to Soss, discloses a system for securing an automobile, dwelling house, or the like, using a remote transmitter for activating or deactivating the system. U.S. Pat. No. 4,991,683, issued to Garretto et al., discloses an anti-theft vehicle system that shuts off power to an engine coil, fuel pump, or fuel flow valve until a reset device, such as a switch or keyboard, is activated. U.S. Pat. No. 4,893, 240, issued to Karkouti, discloses a system for operating selected functions of a vehicle remotely, including starting the engine. U.S. Pat. No. 4,553,511, issued to Hayakawa et al., discloses a keyboard for user input of a code in order to start the ignition of a car. U.S. Pat. No. 4,107,962, issued to MaKinnon, discloses a timing circuit in conjunction with a concealed switch, for providing an auto anti-theft device. U.S. Pat. No. 3,834,484, issued to Sangster discloses an anti-theft device for I.C. engines. U.S. Pat. No. 3,657,720, issued to Avdenko et al., discloses a remote system for starting and stopping an automobile engine by a pair of radio transceivers.

None of the above inventions and patents, taken either singly or in combination, is seen to describe the instant invention as claimed.

SUMMARY OF THE INVENTION

The present invention reduces the number of cars stolen, thus reducing the potential use of the car in subsequent misdeeds by the car thieves. In addition, the present invention reduces the number of cars stolen, stripped and sold as parts by the nefarious "chop shops". The present invention provides security, protection, and safety for a car from would be larcenists. In most instances, stolen cars are used either as "get-away" cars or for black market parts, and are generally involved in a high speed chase. It is unfortunate that in most instances of such a car chase, injuries and/or fatalities may result. In a broader spectrum, the car may be driven by a person who has had too much to drink. Even in this scenario, injuries and/or fatalities are commonly the outcome. Likewise, in recent years many larger cities have seen an increase in "car jacking" incidents. These situations involve an unsuspecting motorist having their vehicle commandeered for no apparent reason. However, the vehicles are usually damaged and the motorist has suffered mental and physical harm.

According to one embodiment of the invention, the anti-theft device in placed on an automobile in combination with a fuel tank, a fuel line, and an ignition switch. The anti-theft device includes a control panel mounted within the vehicle interior and an electromagnetic valve disposed between the fuel tank and the fuel line. The control panel includes a keypad, circuitry having plural inputs and an output which allows the circuitry to be electrically coupled to the keypad and the ignition switch at its inputs and to the electromagnetic valve at its output, and a processor integral with the circuitry and responsive to plural inputs for controlling the electromagnetic valve. The processor is activated by the ignition switch and prompts a user to enter a first security code through the keypad, next the processor compares the first security code to a stored code and controls operation of the electromagnetic valve in response thereto. The electronic valve is normally maintained in a closed position which prevents fuel flow from the fuel tank through the fuel line. Upon actuation of the electronic valve, it is energized to reciprocate into its open position which allows fuel to flow from the fuel tank through the fuel line. Where the first security code is equivalent to the stored code, the processor actuates the electromagnetic valve to reciprocate into the open position. However, when the first security code is not equivalent to the stored code, the processor prevents actuation of the electromagnetic valve, thereby maintaining the electromagnetic valve in its closed position. A remote unit is provided in a law enforcement patrol car, for example, and the circuitry is provided with a receiver for receiving an override signal from a transmitter of the remote unit. This allows law enforcement officers to disable a vehicle which is currently operating (i.e., the electromagnetic valve in the open position). Upon receipt of the override signal from the transmitter, the processor prevents actuation of the electromagnetic valve and returns the electromagnetic valve to its closed position, thereby disabling the vehicle.

Accordingly, it is a principal object of the invention to provide a security device to a car for preventing car theft.

It is another object of the invention to provide a system requiring a private identification number code for securing a car.

It is a further object of the invention to provide a remote control of the security device of the car.

Still another object of the invention is to equip a car with a device that shuts off the fuel flow to the engine, preventing the improper operation of the car.

It is still another object of the invention is to equip a car with a device that shuts off the fuel flow to the engine via remote control, preventing the improper operation of the car.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
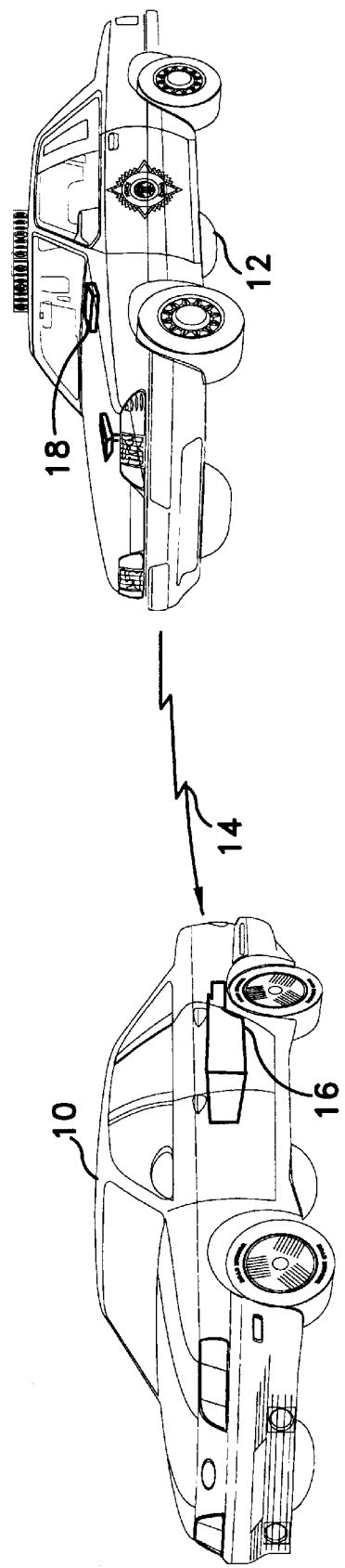
FIG. 1 is an environmental view of the invention in use.

The present invention provides security, protection, and safety for a car from would be larcenists. As shown in FIG. 1, a stolen car 10 is being pursued by a law enforcement vehicle 12, possibly at a high rate of speed. It is unfortunate that in most instances such a car chase may result in injuries and/or fatalities. The present invention gives the law enforcement vehicle 12 an edge to prevent dangerous acts to be perpetrated by the driver of the car 10. The law enforcement vehicle 12 carries a remote transmitter 18 that sends a signal 14 to a receiver 16 in the car 10 causing the fuel flow to the engine to cease, thereby disabling the car 10.

Figure 2:
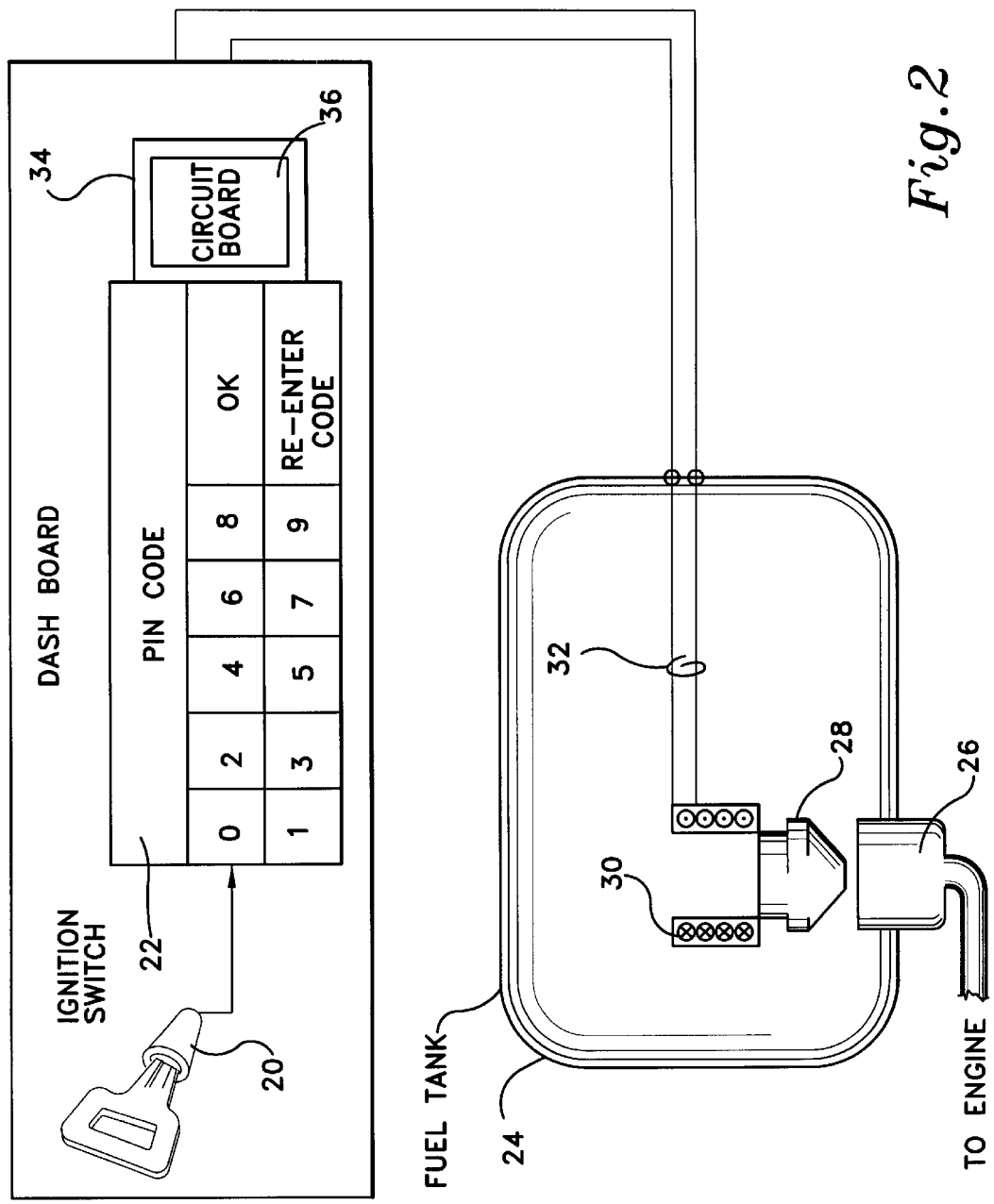
FIG. 2 is a block diagram of the invention.

The present invention, as shown in FIG. 2, is installed in the car 10 in cooperation with the ignition switch 20. The ignition switch 20 normally starts the engine, however, a keypad 22 is installed intermediate the ignition switch 20 and the engine. It is conventional in the art to provide an intermediate switch between an ignition switch and the engine. Such switches merely allow the electrical ignition circuit to close. The keypad 22 does not interfere with the electrical ignition circuit, rather the keypad 22 responds to the ignition switch 20 and also receives a private identification (PIN) code. The PIN code is known only to the owner or driver of the car (and anyone he or she wishes to have the code). Once the ignition switch is turned to the first position, the PIN code must be entered on the keypad 22. If the proper code is entered, the "OK" light will be momentarily illuminated and then the car is ready to start. On the other hand, if an improper code is entered, the "RE-ENTER CODE" light will be illuminated until the proper code is entered. The device is definable to accept a number of attempts (i.e., up to five attempts) for proper code entry, but preferably only two attempts will be accepted. If the proper code is not entered via keypad 22 within the allotted number of attempts, the device will not open the fuel supply, thus preventing the car from being driven.

Housing 34 (containing circuit board 36) is hermetically sealed, preventing entry by elemental contaminants, and uninvadably sealed, preventing infiltration by a would be perpetrator. Circuit board 36 includes circuitry capable of receiving codes, storing codes, processing codes, and controlling the valve represented as solenoid 30 and magnetized core stopper 28. In addition, housing 34 is permanently attached to the keypad 22 which is in electrical communication with the circuit board 36. Connecting the fuel tank to the engine is fuel line 26. Circuit board 36 provides electrical current to conductors 32 which terminate, internally of fuel tank 24, at electromagnet or solenoid 30. The code entered on keypad 22 is examined by the circuit board 36 and determined if it is the proper code. Once the code is determined to be proper or improper, signal line carries the appropriate control to illuminate keypad 22. The polarity of the current on conductors 32 causes a magnetized core stopper 28 to reciprocate within the solenoid 30 between open and closed positions. For example, if the driver enters the PIN code improperly, circuit board 36 will not apply current to conductors 32; thereby preventing solenoid 30 from generating a magnetic force. If the entry is proper, then the circuit board 36 applies current to conductors 32 such that solenoid 30 generates a magnetic force of opposite direction, which causes the stopper 28 to disengage the end of fuel line 26 and allows fuel to flow to the engine.

The device of the instant invention, may additionally be fashioned with a manual "ON-OFF" switch (not shown) allowing the driver of the car to immediately disable the vehicle. This is most effective if the driver is a victim of a car-jacking. When forced to exit the vehicle by a car-jacker, the driver may throw the manual switch to render the car inoperable within a few feet of travel. The manual switch may be inconspicuously located within the interior of the car (e.g., on the steering wheel, or on the side of the seat) so that the driver may access it as they leave the car.

Figure 3:
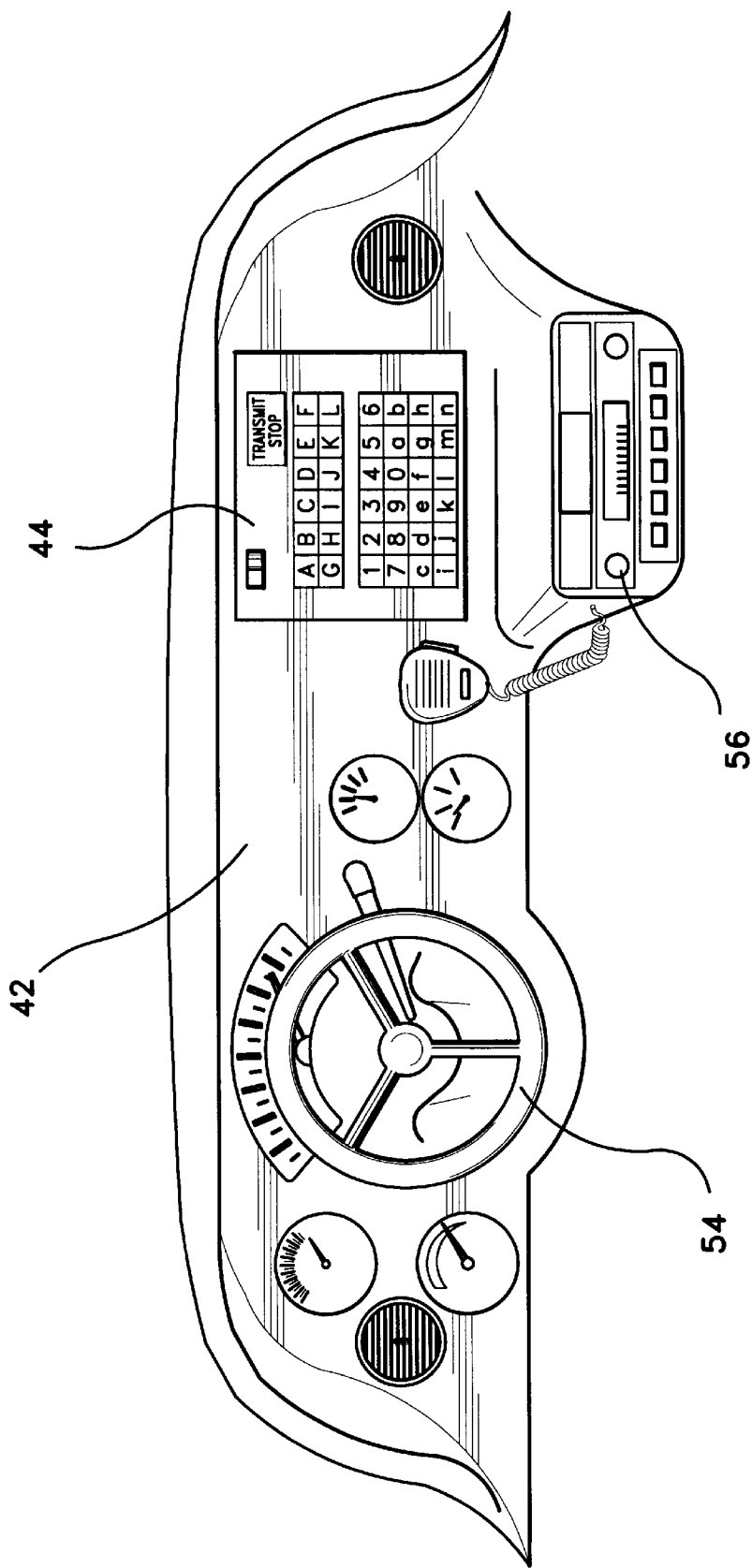
FIG. 3 is an environmental view of the remote transmitter of the present invention.
Figure 4:
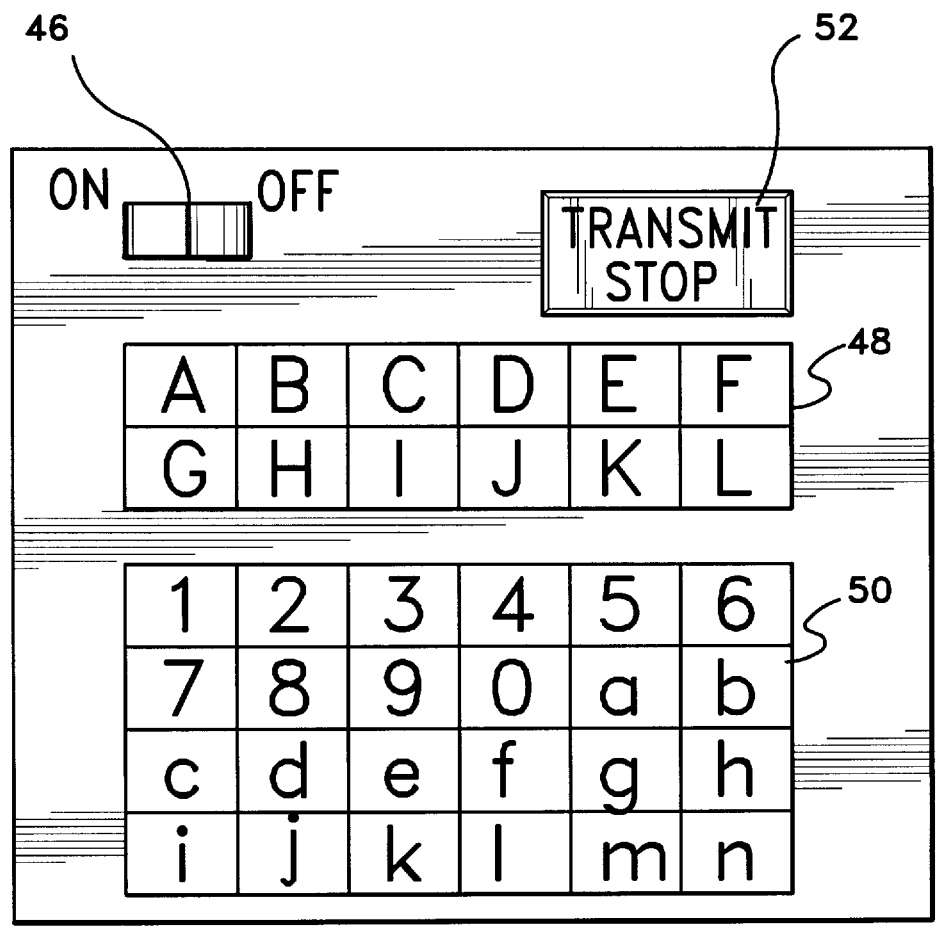
FIG. 4 is an elevational view of the remote transmitter of the present invention.

The instant invention also provides security if a larcenist manages to by-pass the PIN code entry (i.e., by chance, enters the correct code), by including in circuit board 36 a remote controlled override system. The remote controlled override system includes a receiver 16 for receiving a signal 14 transmitted from a law enforcement vehicle 12. FIGS. 3 and 4 show the remote control system used to transmit the signal 14. Mounted in the law enforcement vehicle 12 is the remote control keypad 44. The remote keypad 44 is as accessible to the pilot, or co-pilot of the law enforcement vehicle 12, as is the remaining equipment (i.e., steering wheel 54, two-way radio 56, dashboard gauges 42, etc.). Remote keypad 44 has an "ON-OFF" switch 46, and a "TRANSMIT STOP" button 52. The law enforcement personnel, upon receipt of a transmission via two-way radio 56 that the car 10 has been stolen, may disable the car 10 using the remote keypad 44 as discussed hereinafter. The law enforcement personnel identifies the car 10 by physical markings (make, model, year) and by license plate number, and submits the information to a resource center (e.g., a dispatcher) via the two-way radio 56. The dispatcher relays two separate codes to the law enforcement personnel. The first code represents the physical identification, and the second code represents the registered information. Upon receipt of these codes, the law enforcement personnel turns on the remote control keypad 44, enters the first code via keypad section 48, enters the second code via keypad section 50, and depresses the button 52. A system override signal 14 is then transmitted from the transmitter 18 to a receiver 16. Once the circuit board 36 receives the signal 14 via receiver 16, the circuit board 36 applies current on conductors 32 so that the stopper 28 is forced into engagement (its closed position) with the fuel line 26. The engine will ultimately fail due to the lack of fuel and the car 10 will come to stop, allowing the law enforcement personnel to apprehend the culprits.

Additionally, the remote control keypad 44 in law enforcement vehicle 12 may optionally be fashioned with a display to collect the transmissions activating the shut off device of car (or cars) 10. Such display merely provides a "policing" of the law enforcement personnel to forgo a prankish quiet night on the beat, that is, keeping the law enforcement personnel from randomly and arbitrarily shutting off a car for no apparent reason.

The device of the present invention provides a cost effective maintenance system for preventing auto theft, substantially gives the owner of a vehicle an increased peace of mind knowing that the property is secure, and ultimately will reduce insurance premiums because the device will offer some protection against damage to person and property. It is to be understood that only the preferred embodiment has been shown and described and that all changes and modifications that come within the spirit and scope of the invention are desired to be protected.

I claim:

1. A disabling system for a vehicle having a fuel tank, fuel line and a key ignition switch, said disabling system comprising:

an electromagnetic valve disposed within the fuel tank, said valve reciprocating between an open position and a closed position for controlling fuel flow from the fuel tank through the fuel line;

a first keypad mounted within the vehicle for inputting a first security code;

circuitry having inputs and an output, said circuitry electrically coupled to said first keypad and the ignition switch at said inputs and electrically coupled to said electromagnetic valve at said output;

processor means for comparing the first security code to a stored code, said processor means being coupled to said circuitry and activated by the ignition switch;

receiver means electrically coupled to said circuitry; and a second remote keypad mounted within a law enforcement vehicle, said second keypad including transmitter means for transmitting an override signal to said receiver means;

wherein said processor means prevents activation of the electromagnetic value and returns the valve to its closed position upon reception by the receiver means of the override signal, thereby disabling the vehicle.

2. The system according to claim 1, wherein said second remote keypad comprises a first keyboard panel for inputting a vehicle identification code and a second keyboard panel for imputing a second security code; whereby upon correct entry of the identification code and the second override code, said transmitter means transmits the security signal to said receiver means.

3. The system according to claim 1, wherein said processor means prevents actuation of said electromagnetic valve to maintain the valve in the closed position when the entered first security code and the stored code are not equal and allows actuation of said electromagnetic valve to reciprocate the valve in the open position when the entered first security code and the stored code are equal.

4. The system according to claim 1, further including display means disposed within the vehicle for visually indicating the position of said electromagnetic valve.

* * * * *